(12) United States Patent
Besnard et al.

(10) Patent No.: US 11,772,811 B2
(45) Date of Patent: Oct. 3, 2023

(54) SYSTEM FOR REMOTE INTERACTION WITH A POINTING MEANS OF AN AIRCRAFT COCKPIT DISPLAY SYSTEM

(71) Applicant: THALES, Courbevoie (FR)

(72) Inventors: Mathieu Besnard, Merignac (FR); Philippe Coni, Merignac (FR); Sarah Egea, Merignac (FR); Yannick Le Roux, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/744,703

(22) Filed: May 15, 2022

(65) Prior Publication Data

US 2022/0396368 A1   Dec. 15, 2022

(30) Foreign Application Priority Data

May 17, 2021   (FR) ...................... 2105110

(51) Int. Cl.
*B64D 43/00*   (2006.01)
*B60K 35/00*   (2006.01)

(52) U.S. Cl.
CPC ............ *B64D 43/00* (2013.01); *B60K 35/00* (2013.01); *B60K 2370/139* (2019.05); *B60K 2370/1434* (2019.05); *B60K 2370/33* (2019.05); *B60K 2370/774* (2019.05); *B60K 2370/81* (2019.05); *B60Y 2200/50* (2013.01)

(58) Field of Classification Search
None
See application file for complete search history.

(56) References Cited

U.S. PATENT DOCUMENTS

| 7,062,300 | B1 * | 6/2006 | Kim ................... B60R 11/0241 455/90.3 |
| 10,732,774 | B1 | 8/2020 | Gosch et al. |
| 2011/0303802 | A1 * | 12/2011 | Nutaro ..................... G05G 1/62 248/118 |
| 2014/0062884 | A1 | 3/2014 | Davies et al. |
| 2016/0378320 | A1 * | 12/2016 | Suzuki .................... G06F 3/016 345/158 |

FOREIGN PATENT DOCUMENTS

| EP | 2 808 763 A2 | 12/2014 |
| WO | 2021/005166 A1 | 1/2021 |

* cited by examiner

*Primary Examiner* — Matthew Yeung
(74) *Attorney, Agent, or Firm* — BakerHostetler

(57) ABSTRACT

A system for remote interaction with a pointing means of an aircraft cockpit display system, equipped with HMIs, includes three layers: a lower layer configured so as to receive wired electric power supply and data exchange connections; an upper layer comprising a hand-rest knob, at least one physical interaction means configured so as to interact on the pointing means for pointing at the HMIs of the cockpit, and a module with a touch-sensitive flat surface configured so as to interact on the pointing device for pointing at the HMIs of the cockpit and arranged in the extension of the hand-rest knob; and an intermediate layer configured so as to make it possible to modify the position of the upper layer.

14 Claims, 11 Drawing Sheets

SYSTEM FOR REMOTE INTERACTION WITH A POINTING MEANS OF AN AIRCRAFT COCKPIT DISPLAY SYSTEM

CROSS-REFERENCE TO RELATED APPLICATION

This application claims priority to foreign French patent application No. FR 2105110, filed on May 17, 2021, the disclosure of which is incorporated by reference in its entirety.

FIELD OF THE INVENTION

The invention relates to a system for remote interaction with a pointing means of an aircraft cockpit display system comprising HMIs.

The invention relates in general to the way of interacting on a cockpit system consisting of a display device comprising a large single screen or a plurality of screens arranged essentially in the instrument panel.

BACKGROUND

An interface between the pilot and the system of an aircraft cockpit essentially consists of multifunction screens and control members.

Historically, the control members were separate from the main screens, in the form of control panels equipped with various physical interaction means, such as switches, rotary selectors or buttons.

Hereafter, these control members were partially integrated into the displays, in the form of functional buttons located all around the screen, possibly supplemented with one or more rotators.

However, the interactive experience remains frustrating in comparison with the world of micro-computing, based on the use of windows, menus, and icons able to be activated by way of a pointer.

As illustrated in FIG. 1 and FIG. 2, the modern generation of cockpits has therefore seen the introduction of an interaction device with a pointing means functionally identical to a mouse, called CCD for "Control Cursor Display", based on a trackball, and making it possible to interact directly on the screens of the cockpit. Such a device proves to be impractical in terms of use, since the movement of a pointer by way of a trackball is less natural and efficient than with a mouse.

Such a device 1 is shown in FIG. 1 in the cockpit, and in more detail in FIG. 2.

User experience of such a device, abbreviated to WIMP for "Windows, Icons, Menus and Pointer" since it is based on a graphical interface consisting of windows, icons and menus able to be activated by way of a pointer.

During use, such a device remains frustrating in comparison with tablets and smartphones based on direct touch interaction on the screen.

Recently, cockpits of civilian aircraft have started being equipped with touch screens, thereby allowing the pilot and/or the co-pilot to interact directly and intuitively with the screens.

However, in the context of a cockpit consisting of large screens, or even a single screen, it is not possible to have the entire display surface within arm's reach, and even less so at a distance compatible with touch gestures.

In addition, these touch screens are difficult to use when vibrations are present, or when the pilot moves his seat back in the cruise flight position.

SUMMARY OF THE INVENTION

One aim of the invention, i.e. of a post-WIMP CCD, is to provide the pilot and/or co-pilot with a medium for interacting remotely with the HMIs of the cockpit, in an ergonomic and effective manner.

Modern CODs are designed in the form of WIMP interaction media, that is to say by way of a pointer that interacts with icons, menus and windows. The pointer is moved over a screen of the cockpit using a trackball or joystick, and the actions are performed by way of dedicated buttons. It is not possible to interact with a system designed post-WIMP without leading to a poor user experience, and there is at present no native post-WIMP interface for an avionic CCD.

The only known product is "Precision touchpad" from Microsoft®, which effectively allows multipoint or multi-contact (or multi-touch) interaction, and this technology is most likely valued by motor vehicle manufacturers. However, implementing these constitutes another technological barrier for critical use, especially for the aeronautical field, from the standpoint of safeguarding interactions, use in a vibrating and turbulent environment, the ability to withstand a strong electromagnetic environment, and the complexity of the capacitive controller (implementation, tuning or setting to determine the optimum values of the parameters and to maintain the best possible touch sensitivity regardless of the interference that may occur in the environment, readout noise for a measurement in the femto-farad class, design assurance level, data access layer DAL).

For all of these reasons, there is no satisfactory product for a post-WIMP CCD on the avionics market.

Another aim of the invention is to be able to be used by the pilot in the event of turbulence when it is difficult (or even impossible) and/or less effective to use the touch screens.

Another aim of the invention is to be able to be used comfortably by the pilot or the co-pilot in all positions, even in the moved-back seat position. The forward position (close to the HMIs of the cockpit) is used in critical phases (take-off and landing), while the moved-back position is used in the cruising phase (synonymous with seating comfort). The entire benefit of the post-WIMP CCD is in the latter position, since it provides the user with a medium for interacting remotely with the HMIs of the cockpit in a comfortable manner (without reaching out to the HMIs).

Another aim of the invention is to be able to be supplemented by a for example alphanumeric input keypad.

Two post-WIMP CODs are intended to be installed in the cockpit, 1 per pilot. There is a need for the same product (unique part number) to be able to be installed for each pilot. The CCD should therefore be designed to be ambidextrous. The ambidextrous function could be useful in small cockpits in which there would be only one post-WIMP CCD between the two potential users.

Another aim of the invention is to be as compact as possible in the cockpit.

Another aim of the invention is to have harmonious integration, to ensure easy cleaning and to demonstrate intuitive use.

Another aim of the invention is to be adaptable to the majority of cockpits, and to be able to be adjusted by the user such that use thereof is ergonomic for a user both with the right hand and with the left hand, typically in small cockpits in which there is space for only one that will be used by either the pilot or the co-pilot.

What is proposed, according to one aspect of the invention, is a system for remote interaction with a pointing means of an aircraft cockpit display system equipped with HMIs, comprising three layers:

a lower layer configured so as to receive wired electric power supply and data exchange connections;

an upper layer comprising a hand-rest knob, at least one physical interaction means configured so as to interact on a pointing device for pointing at the HMIs of the cockpit, and a module with a touch-sensitive flat surface configured so as to interact on the pointing means for pointing at the HMIs of the cockpit and arranged in the extension of the hand-rest knob; and an intermediate layer configured so as to make it possible to modify the position of the upper layer.

Such a system with a three-layer design makes it possible to adapt to all carriers and to various locations in the cockpit (pedestal, central console or even in the armrest), while at the same time ensuring an ergonomic position for the user. Furthermore, the presence of a hand rest, ensuring stability for the pilot in his interaction actions with the display system, and the presence of a module with a touch-sensitive flat surface configured so as to interact on the pointing device for pointing at the HMIs of the cockpit and arranged in the extension of the hand rest allows the user's hand to perform all post-WIMP gestures and touch interactions comfortably, ergonomically, intuitively and safely.

According to one embodiment, the module with a touch-sensitive flat surface configured so as to interact on the pointing device for pointing at the HMIs of the cockpit comprises a multi-contact capacitive touch pad, or a touch screen configured so as to implement an alphanumeric keypad, or a touch surface associated with an infrared sensor.

The module with a touch-sensitive flat surface is thus adapted based on the needs of the client, the type of carrier and environmental constraints to be withstood.

In one embodiment, the upper layer has a V-shaped structure and the hand-rest knob has an inverted-V-shaped structure.

This combination of shapes thus makes it possible to ensure an ergonomic and comfortable hand position, with the palm resting on the knob and the fingers falling naturally and intuitively onto the module with a touch-sensitive flat surface.

According to one embodiment, the V has an angular aperture of between 65° and 250°.

One part of this angular aperture range of the V (for example between 65° and 180°) allows the user to see the module with a touch-sensitive flat surface, which may thus be a touch screen configured so as to implement an alphanumeric keypad. Another part of this angular aperture range of the V (for example >180°) allows the user to obtain a CCD system with the module with a touch-sensitive flat surface having a layout close to that of a bulb-shaped CCD.

In one embodiment, the inverted V has an angular aperture of between 110° and 160°.

This angular aperture range of the inverted V makes it possible to cover the various needs of the user in terms of ergonomics of the hand-rest knob. This angular aperture range also makes it possible to obtain two zones: a rear zone corresponding to a rest position with the hand placed more at the rear of the knob, and a front zone corresponding to an interaction position with the hand placed more at the front of the knob.

According to one embodiment, the inverted V has an angular aperture of 145°.

This angular aperture makes it possible to obtain a universal knob shape that covers the needs of a large number of users.

In one embodiment, the front part of the inverted-V-shaped hand-rest knob is parallel to the rear part of the V-shaped structure.

This allows the tips of the user's fingers to be at an ergonomic distance from the lateral physical interaction means (buttons) and from the module with a touch-sensitive flat surface.

According to one embodiment, the gap between the upper surface of the rear part of the V-shaped structure and the lower surface of the front part of the inverted-V-shaped hand-rest knob is greater than or equal to 20 mm.

Thus, a free space underneath the knob is present for the passage of the user's fingers, making it possible to ensure firm gripping in the event of turbulence. This free space is also an opportunity to install a presence sensor (a capacitive one underneath the knob) that makes it possible to activate additional functions.

In one embodiment, the intermediate layer comprises a baseplate (i.e. a plate that fills the allocated space in the cockpit of the carrier and that has fastening elements compatible with the carrier) configured so as to be adapted to its installation position in the cockpit and to the fastening required by the aircraft.

This baseplate, which is able to be adapted in terms of finish (colour and texture equivalent to the rest of the cockpit), in terms of dimensions and in terms of fastening means, makes it possible to offer a flexible and modular product range. This adaptable plate thus allows harmonious integration of the system into the cockpit of the carrier. In addition, this baseplate may be configured according to the carrier without changing the upper layer. This thus has an industrial advantage with investments in tooling (moulds) that are better harnessed for the components of the upper layer.

According to one embodiment, the intermediate layer comprises a rotary adaptor, configured so as to rotate the upper layer about a horizontal axis.

For example, the rotary adaptor, configured so as to rotate the upper layer about a horizontal axis, is configured so as to tilt up to 45° with respect to the horizontal.

In one embodiment, the intermediate layer comprises a translatory adaptor, arranged on the baseplate, configured so as to move the upper layer in translation with respect to the intermediate layer.

According to one embodiment, the upper layer comprises a translatory adaptor, configured so as to move the intermediate layer in translation with respect to the lower layer.

In one embodiment, the intermediate layer comprises a rotary adaptor, configured so as to rotate the elements arranged above the baseplate jointly about a horizontal axis.

These rotary and translatory adaptors make it possible to perform personalized setting of the position of the CCD system based on the desired ergonomics and the location of the user's seat, and to have access to the equipment situated in front of the system, since the unfolded V shape is able to partially mask the equipments situated in front of the system.

According to one embodiment, the upper layer comprises a device configured so as to modify the angular aperture of the V-shaped structure.

This device thus allows personalized setting based on the desired ergonomics and the location of the user's seat, and allows access to the equipment situated in front of the system, since the unfolded V-shaped structure is able to partially mask the equipments situated in front of the system.

In one embodiment, the upper layer comprises a device configured so as to make it possible to retract the module with a touch-sensitive flat surface.

Such a device is configured so as to make it possible to retract the module with a touch-sensitive flat surface.

The presence of a retraction device makes it possible to reduce the bulk of the system in the cockpit. It allows personalized setting of the position of the CCD system based on the desired ergonomics and the location of the user's seat, and allows access to the equipment situated in front of the system, since the unfolded V-shaped structure is able to partially mask the equipments situated in front of the system.

According to one embodiment, the upper layer comprises an ambient light device.

An ambient light connected or not connected to the rest of the cockpit makes it possible to create harmony, which may be added to improve appearance, and identify the knob and the buttons more easily by illuminating them.

According to one embodiment, the baseplate comprises fastening screw cover devices.

The system may thus be cleaned without impairing availability or maintainability.

BRIEF DESCRIPTION OF THE DRAWINGS

The invention will be better understood on studying a few embodiments, which are described by way of wholly non-limiting examples and illustrated by the appended drawings, in which.

Throughout the figures, elements having identical references are similar.

DETAILED DESCRIPTION

In the present description, the embodiments that are described are not limiting, and features and functions well known to those skilled in the art are not described in detail.

Figure 3:
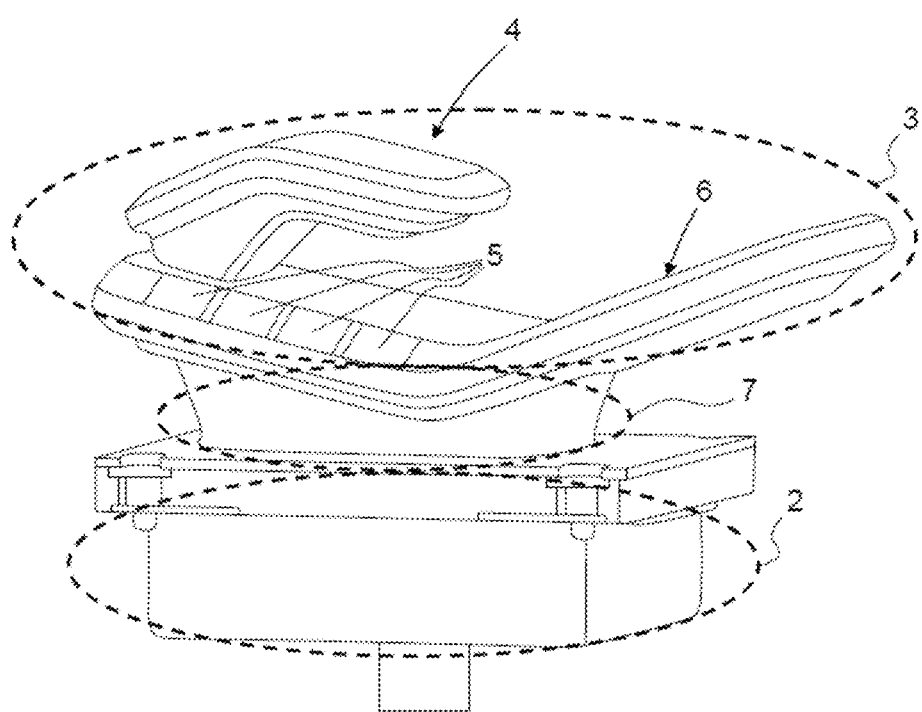
FIG. 3 schematically illustrates a system for remote interaction with a pointing means of an aircraft cockpit display system equipped with HMIs, according to one aspect of the invention, FIG. 4 schematically illustrates an exploded view of the system from FIG. 3, according to one aspect of the invention.

FIG. 3 shows, according to one aspect of the invention, a system for remote interaction with a pointing means of an aircraft cockpit display system equipped with HMIs, comprising three layers:
- a lower layer 2 configured so as to receive wired electric power supply and data exchange connections;
- an upper layer 3 comprising a hand-rest knob 4, at least one physical interaction means 5 configured so as to interact on a pointing device for pointing at the HMIs of the cockpit, and a module 6 with a touch-sensitive flat surface configured so as to interact on the pointing means for pointing at the HMIs of the cockpit and arranged in the extension of the hand-rest knob 4; and
- an intermediate layer 7 configured so as to make it possible to modify the position of the upper layer 3.

Figure 4:
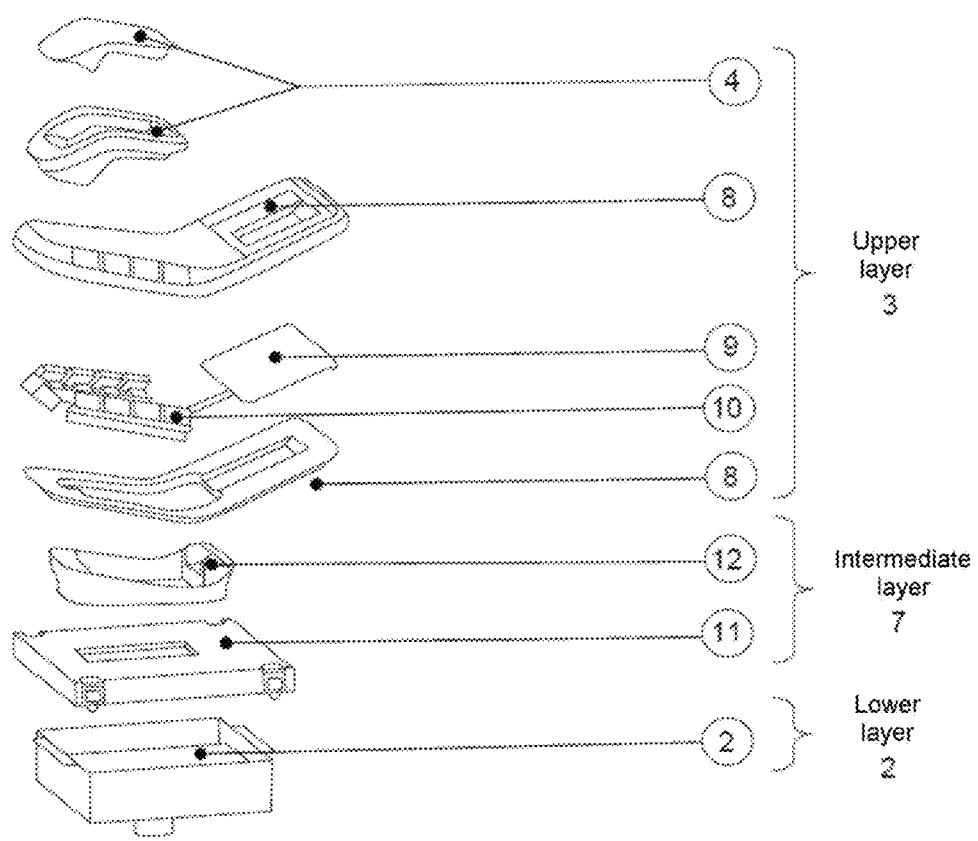

FIG. 4 schematically illustrates an exploded view of one embodiment of a system from FIG. 3.

The upper layer 3 comprises a V-shaped structure 8, for example with a lower base and an upper receptacle, allowing better comfort and perfect legibility of its touch zone, possibly comprising the module with a touch-sensitive flat surface, such as a multi-contact capacitive touch pad, or a touch screen configured so as to implement an alphanumeric keypad, or a touch surface associated with an infrared sensor.

This V-shaped structure 8 may be made of aluminium alloy or even of (fibreglass or carbon) reinforced thermoplastic, possibly with a metallization in order to shield it. These materials are preferably chosen since they make it possible to achieve a low mass, good rigidity, complex shapes or even personalization (colour, pleasant touch or ergonomic). Various textures, embossings or cavities may be added to the V-shaped structure, around the module with a touch-sensitive flat surface or physical interaction means, so as to be able to locate the position of the fingers with respect to the module with a touch-sensitive flat surface or with respect to the physical interaction means (buttons) blind (in the head-up position). The aperture angle or gap of the V is denoted $180°-\alpha-\beta$ in FIG. 5 and FIG. 6.

Figure 6:
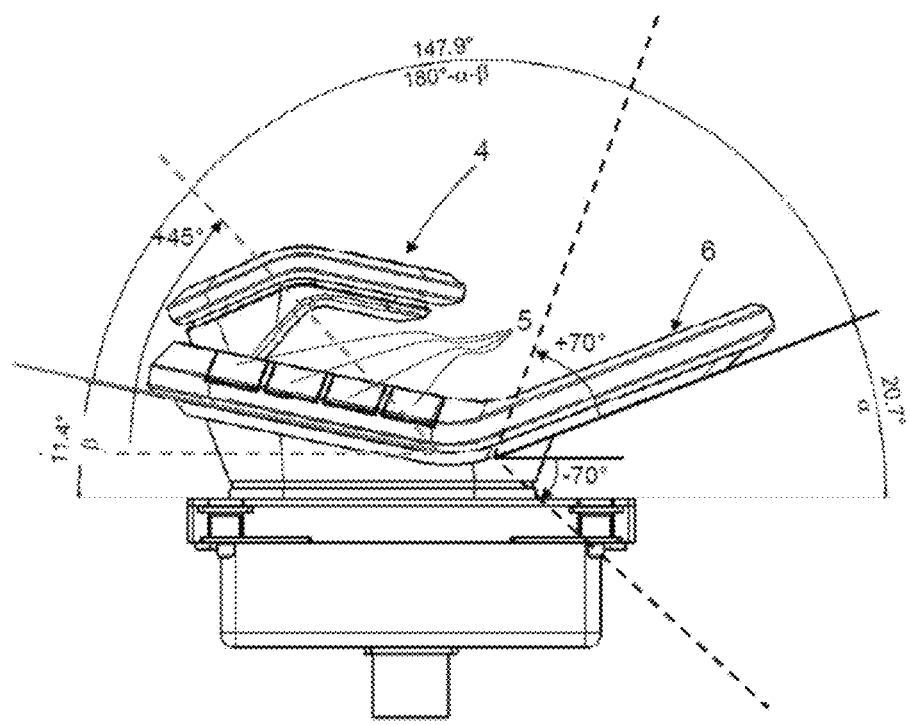
FIG. 6 schematically illustrates the intervals of possible values of the angles from FIG. 4, according to one aspect of the invention.

According to assessments of human factors, to satisfy the various installation positions conceivable on the pedestal, it is preferable for $-70°\leq\alpha\leq70°$ and typically has the value 20.7°, as illustrated in FIG. 6.

The hand-rest knob 4, situated at the rear of the V-shaped structure 8, allows a firm attachment and makes it possible to use the system in the event of turbulence. The knob 4 may be made of aluminium alloy or even of (fibreglass or carbon) reinforced thermoplastic. These materials are preferably chosen to ensure a low mass, good rigidity, complex shapes or even personalization (colour, pleasant touch, easy gripping, etc.).

The knob 4 may be broken down into two components, with a main body and an upper cover on which the palm of the hand rests. The cover material may be adapted and personalized depending on the client. The upper cover may be made of thermoplastic with a pleasant touch or easy gripping. It is therefore possible to make it from noble wood such as mahogany or ebony for business aircraft.

A module with a touch-sensitive flat surface 9 configured so as to interact on the pointing means for pointing at the HMIs of the cockpit is situated in front of the hand-rest knob 4 with a settable or non-settable ergonomic incline.

The module with a touch-sensitive flat surface 9 may comprise a multi-contact capacitive touch pad, or a touch screen configured so as to implement an alphanumeric keypad, or a touch surface associated with an infrared sensor.

Figure 1:
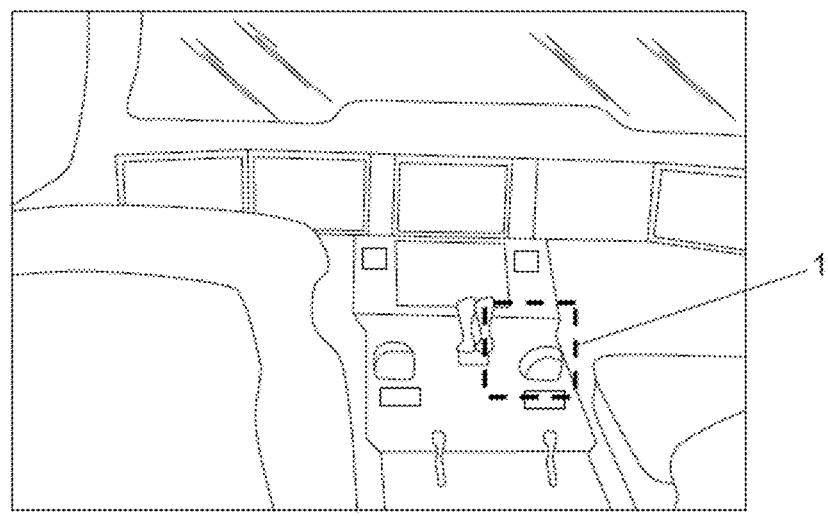
FIG. 1 schematically illustrates a system for remote interaction with a pointing means of an aircraft cockpit display system equipped with HMIs, according to the prior art.
Figure 2:
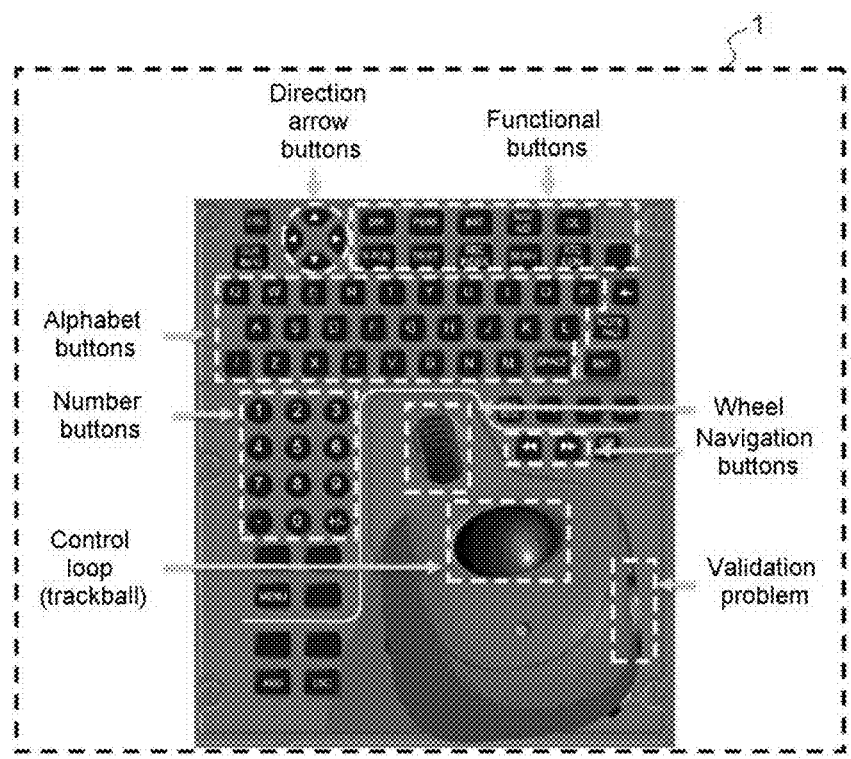
FIG. 2 schematically illustrates a trackball of a system from FIG. 1, according to the prior art.

In the case of a touch screen, this layout allows it to be read by the pilot (this not being possible with a bulb structure from the prior art from FIG. 1). Specifically, in this embodiment, the angle of the V is between 65° and 180° and allows the user to see the module with a touch-sensitive flat surface, which may thus be a touch screen configured so as to implement an alphanumeric keypad. In the case of a bulb-shaped structure (which does not correspond to the embodiment from FIG. 4), the angular angle of the V is greater than 180°, and it does not make it possible to see the module with a touch-sensitive flat surface. In the case of a bulb shape, the integration of a touch screen is irrelevant as it is not seen by the user, unless he leans forward in an uncomfortable manner.

Buttons 10 situated on each side towards the rear of the hand-rest knob 4 allow fast access to functions (for example: button for communicating a message to passengers) and make it possible, in some cases, to have a higher security level than that of the module with a touch-sensitive flat surface 9. These physical interaction means preferably have blind detection means (embossing or cavity on the buttons or finger protector or groove between the buttons) so as to allow the user to locate them through touch while keeping his head up.

The intermediate layer 7 comprises a baseplate 11 (a plate that fills the allocated space in the cockpit of the carrier and that has fastening elements compatible with the carrier) configured so as to be adapted to its installation position in the cockpit and to the fastening required by the aircraft. This baseplate 11, which is able to be adapted in terms of finish (colour and texture equivalent to the rest of the cockpit), in terms of dimensions and in terms of fastening means, makes it possible to offer a flexible and modular product range. This plate 11 has at least one hole at its centre so as to allow the passage of cables between the upper layer and the lower layer.

The baseplate 11 is adapted to the carrier and to the installation position in the cockpit. This baseplate 11 makes it possible to fill the hole allocated to the installation of the remote CCD interaction system and to adapt to the fastening required by the carrier (screw centre distances, screw type, number of screws, etc.).

The intermediate layer 7 may also comprise an incline adaptor 12, arranged on the baseplate 11, for adapting the incline of the upper layer 3. To adjust the product to the carrier and to the user, the incline angle $\beta$, shown in FIG. 5 and FIG. 6, is between 0° and 45°, and typically has the value 11.4°.

The materials used for the intermediate layer 7 and the lower layer 2 may be identical to that (or those) used for the V-shaped structure 8.

Figure 5:
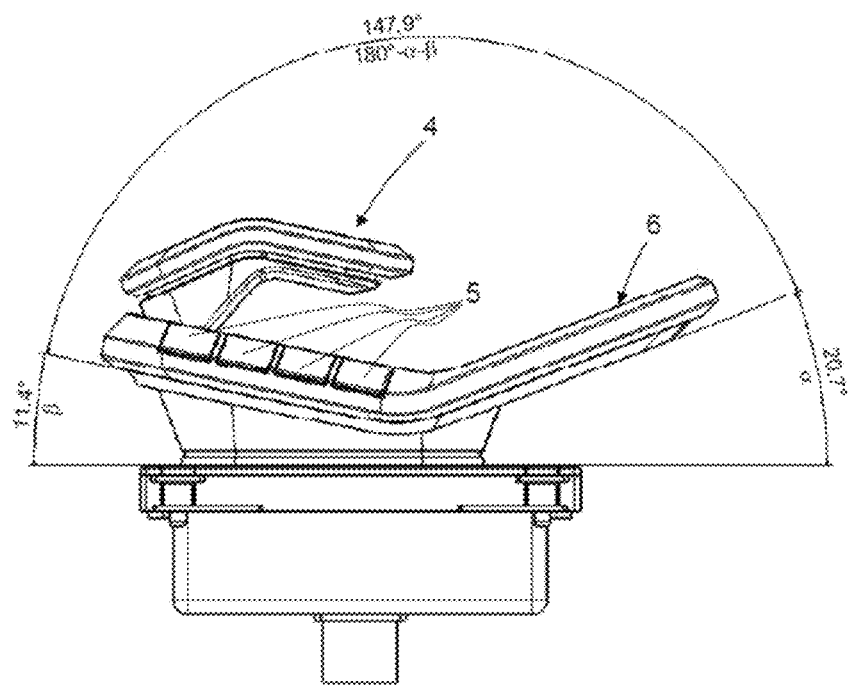
FIG. 5 schematically illustrates angles of the system from FIG. 3, according to one aspect of the invention.

FIG. 5 schematically shows the angles $\alpha$ and $\beta$, referenced with respect to the horizontal corresponding to the upper surface of the baseplate 11, the angles of which, which are optimized based on human factors, are respectively 20.7° and 11.4°, thus with a gap in the V-shaped structure 8 equal to $180°-\alpha-\beta$, i.e. 147.9°.

FIG. 6, in short broken lines, additionally shows the ranges of possible values for the angles $\alpha$ and $\beta$, which are as follows: $-70°\leq\alpha\leq70°$ and $0°\leq\beta\leq45°$, taking the horizontal as reference, and a positive measurement starting from the horizontal and going towards the upper part of the system.

The angle Alpha at $-70°$ may be reached if the elements arranged above the baseplate 11 are moved forwards with respect to the adaptation baseplate 11 (so as to avoid mechanical interference).

These angles are defined in the factory if there is no adjustment device and based on the carrier (for example: incline of the central console) and the needs of the client.

If the CCD system has an adjustment device, $\alpha$ and $\beta$ may be adjusted independently or non-independently in line with the ergonomic amplitudes recommended above. These amplitudes may be exceeded in order to reach rest or storage (or even transport) positions.

Figure 7:
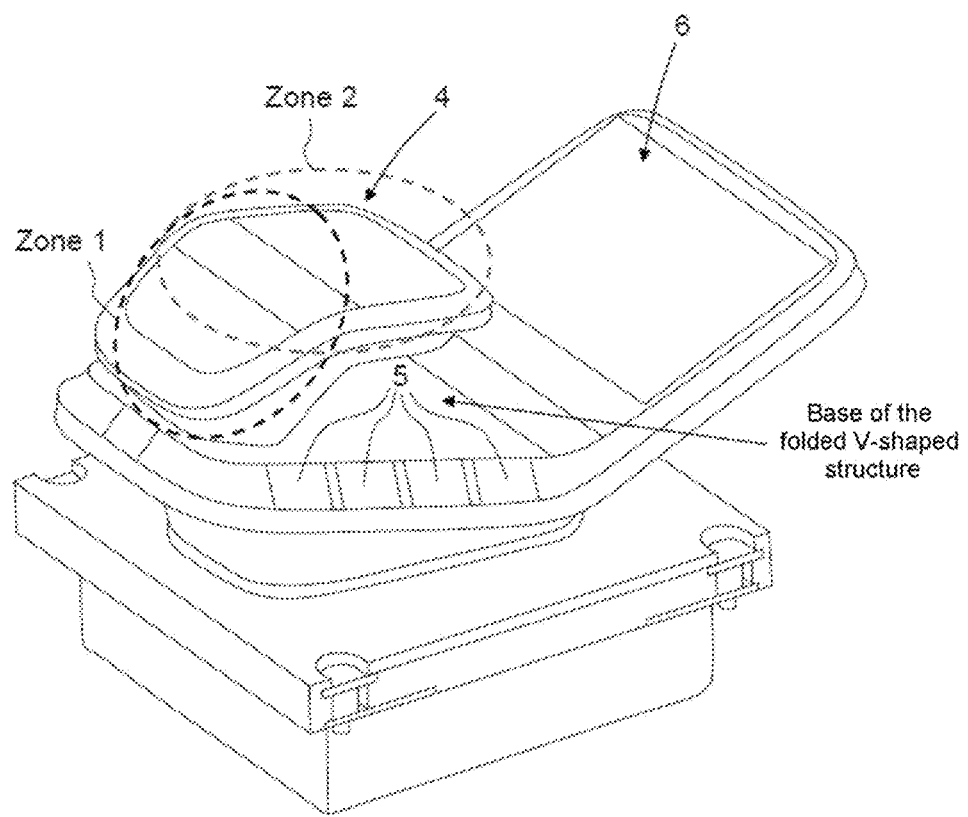
FIG. 7 schematically illustrates the hand-rest knob of the system from FIG. 3, according to one aspect of the invention.

FIG. 7 schematically shows one embodiment of the hand-rest knob 4, with two zones, corresponding to two positions of the user's hand.

Figure 8:
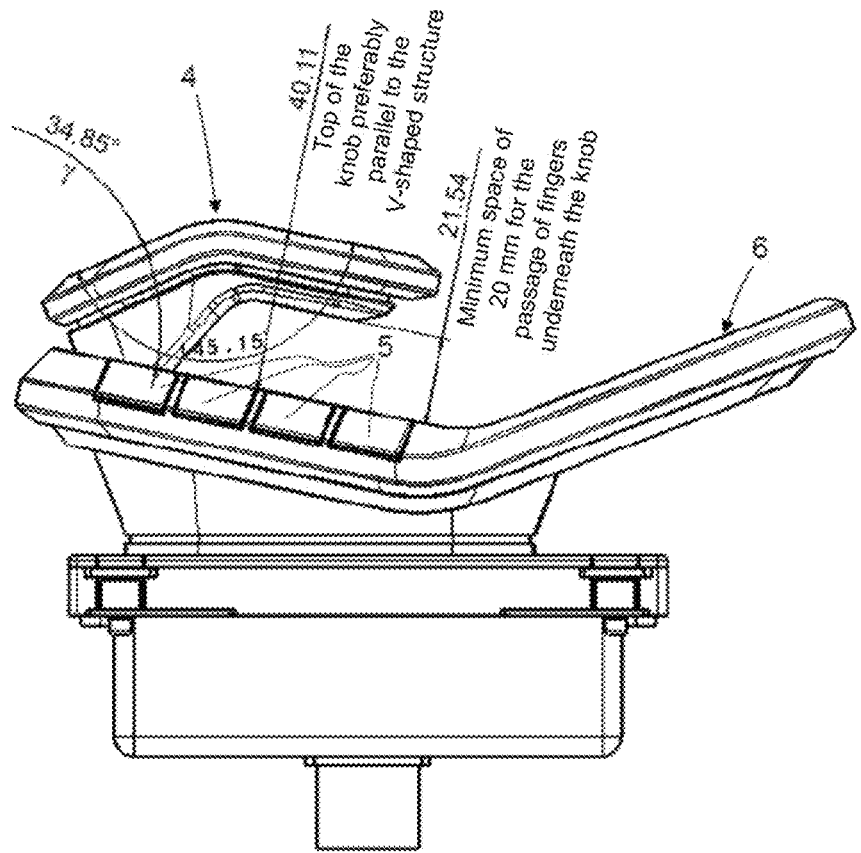
FIG. 8 schematically illustrates the hand-rest knob of the system from FIG. 3, according to one aspect of the invention.

In FIG. 8, a rear zone Zone1 corresponds to a rest position of the user, in which the hand is more at the rear of the knob 4. The angle $\gamma$ between the rear part of the inverted V, i.e. between the rear zone Zone1 and the rear part of the V-shaped structure 8, is 34.85° for reasons of optimizing ergonomics.

A front zone Zone2 corresponds to a position in which the user's hand is at the front so that the user's fingers are able to interact with the module with a touch-sensitive flat surface 9 forming the front of the V-shaped structure 8.

The aperture of the inverted V of the knob 4, for ergonomic reasons linked to human factors, has the value 145.15°.

The hand-rest knob 4 is designed (shape/size/fastening) to be interchangeable and/or personalizable in order to be compatible with the carriers and with the needs of the client, and to ensure firm gripping by the hand in the event of turbulence. For these purposes, a free space underneath the knob 4 is present (minimum height preferably 20 mm, see FIG. 8) for the passage of the fingers. This free space is also an opportunity to install a presence sensor (a capacitive one underneath the knob) that makes it possible to activate additional functions of the system.

It is possible to place presence sensors in the hand-rest knob 4 (above and/or below and/or on the sides of the knob 4) in order to activate additional functions (such as a shift for the buttons) or detect the presence of the user's hand (pilot or co-pilot depending on the detection of the thumb on the right or on the left).

It is also possible to place haptic actuators in the knob 4 in order to improve the haptic sensation for the user (better than that resulting from a haptic actuator in the module 9 with a touch-sensitive flat surface).

Specifically, haptic feedback could occur after a validation task. The haptic feedback may also be used to indicate an anomaly or a usage error.

Figure 9:
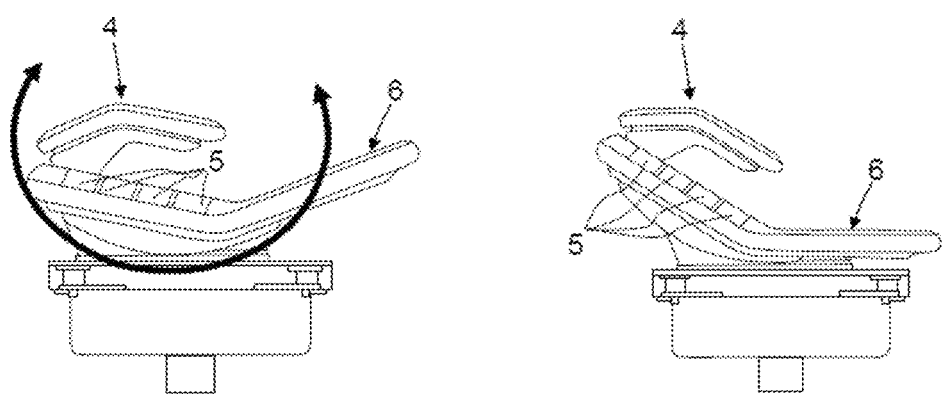
FIG. 9 schematically illustrates one embodiment of the system from FIG. 3, allowing a rotation of the upper layer, according to one aspect of the invention.

FIG. 9 schematically illustrates one embodiment in which the intermediate layer 7 comprises a rotary adaptor 12 configured so as to rotate the upper layer about a horizontal axis, arranged on the baseplate 11, configured so as to adapt the incline of the upper layer 3, allowing the upper layer to rotate about a horizontal axis with a degree of freedom, as shown by the double-headed arrow.

Figure 10:
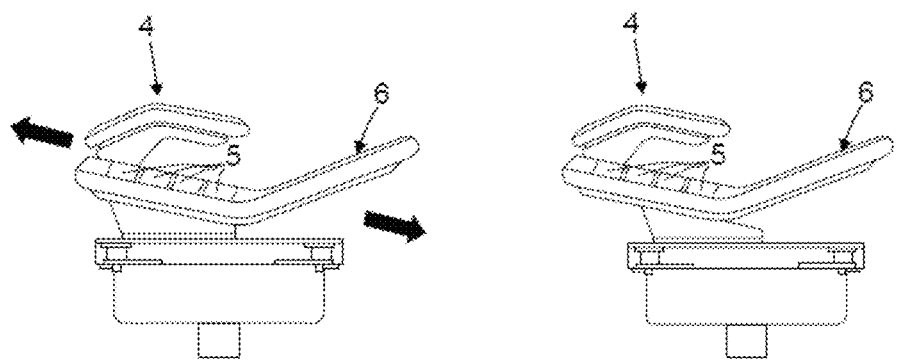
FIG. 10 schematically illustrates one embodiment of the system from FIG. 3, allowing a translational movement of the upper layer, according to one aspect of the invention.

FIG. 10 schematically illustrates one embodiment in which the intermediate layer 7 comprises a translatory adaptor, for example the incline adaptor 12, which might also be configured so as to perform this function, i.e. configured so as to adapt the translational movement of the upper layer 3 with respect to the intermediate layer 7.

Figure 11:
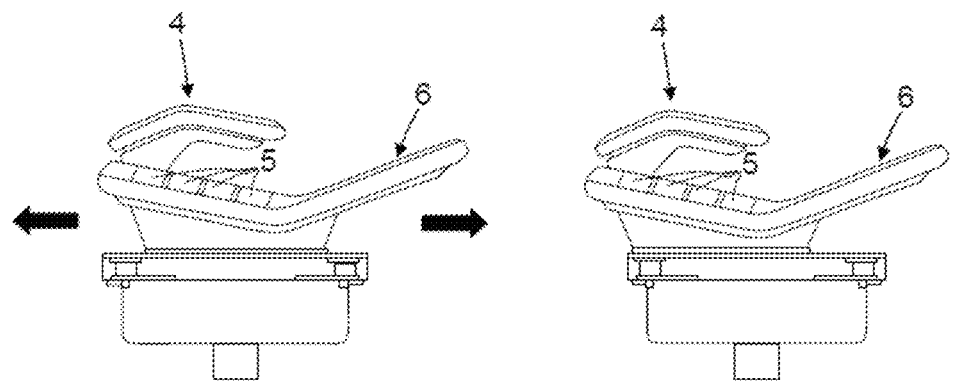
FIG. 11 schematically illustrates one embodiment of the system from FIG. 3, allowing a translational movement of the upper layer, according to one aspect of the invention.

FIG. 11 schematically illustrates one embodiment in which the intermediate layer 7 comprises a translatory adaptor, for example the baseplate 11, which might also be configured so as to perform this function, i.e. configured so as to adapt the translational movement of the intermediate layer 7 with respect to the lower layer 2.

Figure 12:
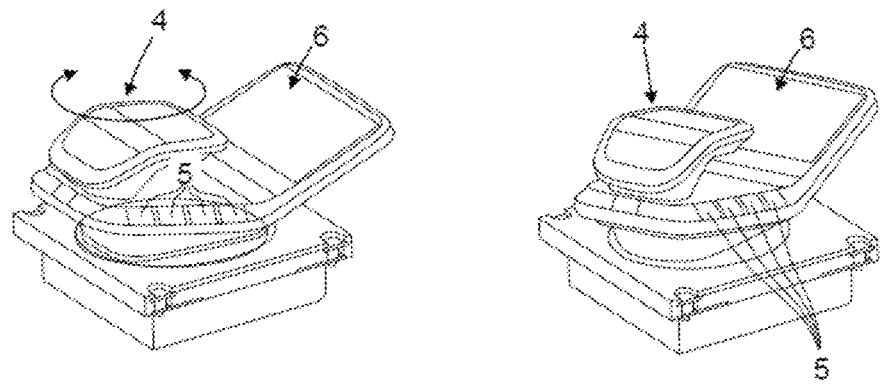
FIG. 12 schematically illustrates one embodiment of the system from FIG. 3, allowing a rotation of the upper layer, according to one aspect of the invention.

FIG. 12 schematically illustrates one embodiment in which the intermediate layer 7 comprises a rotary adaptor, configured so as to rotate the elements arranged above the baseplate jointly about a vertical axis.

These rotary and translatory adaptors make it possible to perform personalized setting of the position of the CCD system based on the desired ergonomics and the location of the user's seat, and to have access to the equipment situated in front of the system, since the unfolded V shape is able to partially mask the equipments situated in front of the system.

These rotary and translatory adaptors have the advantage of keeping the upper layer 3 constant and fully functional. Specifically, the position of the hand between the knob 4 and the touch zone 9 does not change regardless of the setting of these adaptors.

In the embodiment of FIG. 9, the rotation gives better access to the apparatus situated in front of the CCD system. The rotation may be achieved using a guide or a rail of rolling elements, or using a friction guide.

In the embodiments of FIG. 10 and FIG. 11, the horizontal or oblique translational movement may be achieved using a guide or a rail of rolling elements, or using a friction guide.

In the embodiment of FIG. 12, the rotation may be achieved using a roller or a smooth friction bearing.

In the embodiments of FIG. 9, FIG. 10, FIG. 11 and FIG. 12, the translational movement or the rotation may be associated with:
- a friction device or a device with a settable prestress. This friction may be produced by a runner that rubs on the rail and the prestress of which might be adjusted via a screw and a spring. Such a spring makes it possible to maintain the setting and the friction in spite of the wear of the runner; and/or
- a position indexing device. The indexed positions are at least the extreme positions of the CCD system and possibly intermediate positions. The indexing may be achieved:
    using a mechanical device comprising at least one ball prestressed by a spring on part of the rail, called ball path. The latter has pockets or cavities in which the ball is housed so as to reach a stable indexing position. The force for leaving this stable indexing position depends on the dimensions of the ball, of the cavities and of the spring; or using a magnetic system comprising at least one fixed magnet situated in front of a mobile part joined to the upper layer. This mobile part has teeth made from a ferromagnetic material or magnets that generate stable indexing positions when they are situated in front of the fixed magnet. This magnetic indexing system does not add any additional friction outside the indexing positions; and/or
- a position locking system that returns to the highest-strength friction system.

The locking system may be controlled with a mechanism moved by a lever underneath the knob or an electro-mechanism (actuator or electromagnet) actuated by a button; and/or
- a spring return system for forcing the retracted location when the CCD system is located between indexed positions.

Figure 13:
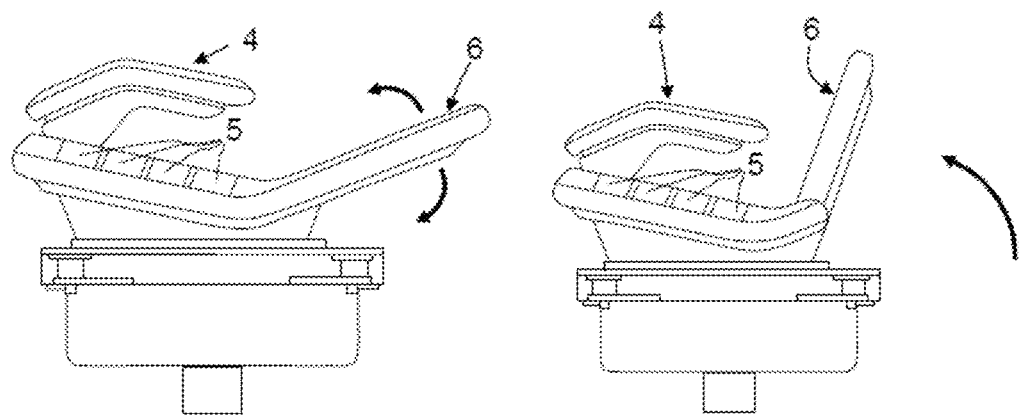
FIG. 13 schematically illustrates one embodiment of the system from FIG. 3, allowing a modification of the incline of the module with a touch-sensitive flat surface, according to one aspect of the invention.

FIG. 13 schematically illustrates one embodiment in which the upper layer comprises a device configured so as to modify the angular aperture of the V-shaped structure.

The upper layer 3 thus consists of two parts. The first part consisting of the hand-rest knob 4 and the buttons 5 is fixed and joined to the other layers of the CCD system. The second part consisting of the module 6 with a touch-sensitive flat surface is able to pivot with respect to the first part along a horizontal axis. This pivot link may be achieved using rollers or smooth bearings to form a hinge. The incline of the touch zone 6 makes it possible to give better access to the apparatus situated at the front of the CCD system. This movement gives the user the possibility to choose the most comfortable incline of the touch zone 6. The touch zone 6 may be inclined by way of a settable friction device and/or an indexing system and/or a location locking system and/or a spring return system (equivalent to the systems described for the embodiments of FIG. 9, FIG. 10, FIG. 11 and FIG. 12).

Figure 14:
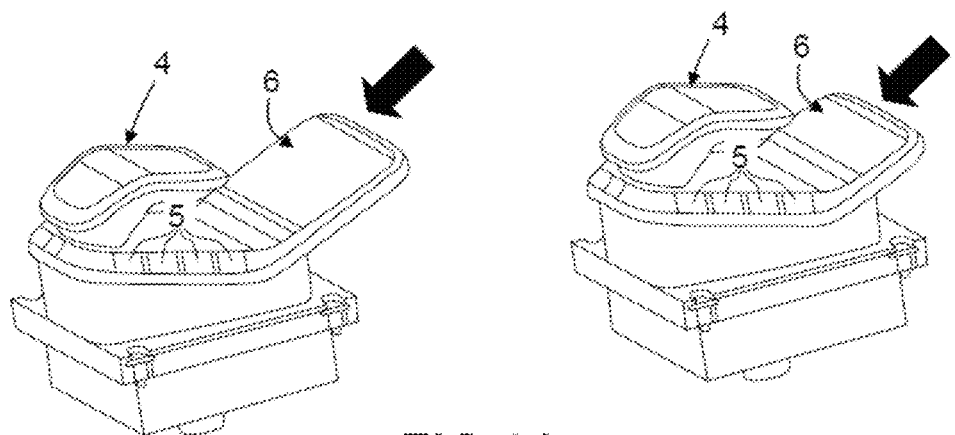
FIG. 14 schematically illustrates one embodiment of the system from FIG. 3, allowing a retraction of the module with a touch-sensitive flat surface, according to one aspect of the invention.

FIG. 14 schematically illustrates one embodiment in which the upper layer comprises a device configured so as to make it possible to retract the module with a touch-sensitive flat surface 9.

It is thus possible to obtain personalized setting of the position of the CCD system based on the desired ergonomics and the location of the user's seat, and access to the equipment situated in front of the system, since the unfolded V shape is able to partially mask the equipments situated in front of the system.

In the embodiment of FIG. 14, the upper layer 3 consists of two parts. The first part comprising the knob 4 and buttons 5 is fixed and joined to the other layers of the CCD system. The second part comprising the module 6 with a touch-sensitive flat surface is able to move in translation with respect to the first part along an oblique axis so that the second part is able to penetrate into the first part. This translational movement may be achieved using a guide with rolling elements or a friction guide. The translational movement of the touch zone 6 makes it possible to give better access to the apparatus situated in front of the CCD system. The translational movement of the touch pad 6 may comprise a settable friction device and/or an indexing device and/or a location locking device and/or a spring return device (equivalent to the systems described for the embodiments of FIG. 9, FIG. 10, FIG. 11 and FIG. 12). In the retracted position, the touch zone 6 may be used in downgraded mode (essential function). The deployment of the touch zone 6 towards the normal usage position may be activated using the touch pad 6 and/or a lever (for example: unlocking of the indexing mechanism and extraction with a spring).

Figure 15:
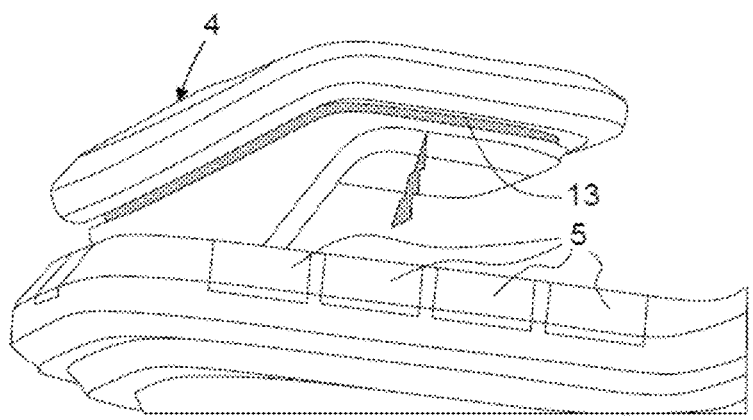
FIG. 15 schematically illustrates one embodiment of the system from FIG. 3, comprising a backlighting module.

FIG. 15 schematically illustrates one embodiment in which the upper layer 3 comprises an ambient light device 13.

The presence of an ambient light, connected or not connected to the rest of the cockpit, makes it possible to create harmony, which may be added to improve appearance, identify the knob more easily or even illuminate the buttons. Specifically, light markings in an emergency or in the event of turbulence may constitute an advantage from a safety standpoint. This lighting may be connected and synchronized with the rest of the cockpit. In this case, it may change colour depending on the context during the flight (for example: flashing red in an emergency). Moreover, this lighting makes it possible to illuminate the side buttons and a button present at the rear. With this option, the internal backlighting of the buttons may be saved on (i.e. removed) in favour of a treatment or a reflective, photoluminescent or phosphorescent material.

Figure 16:
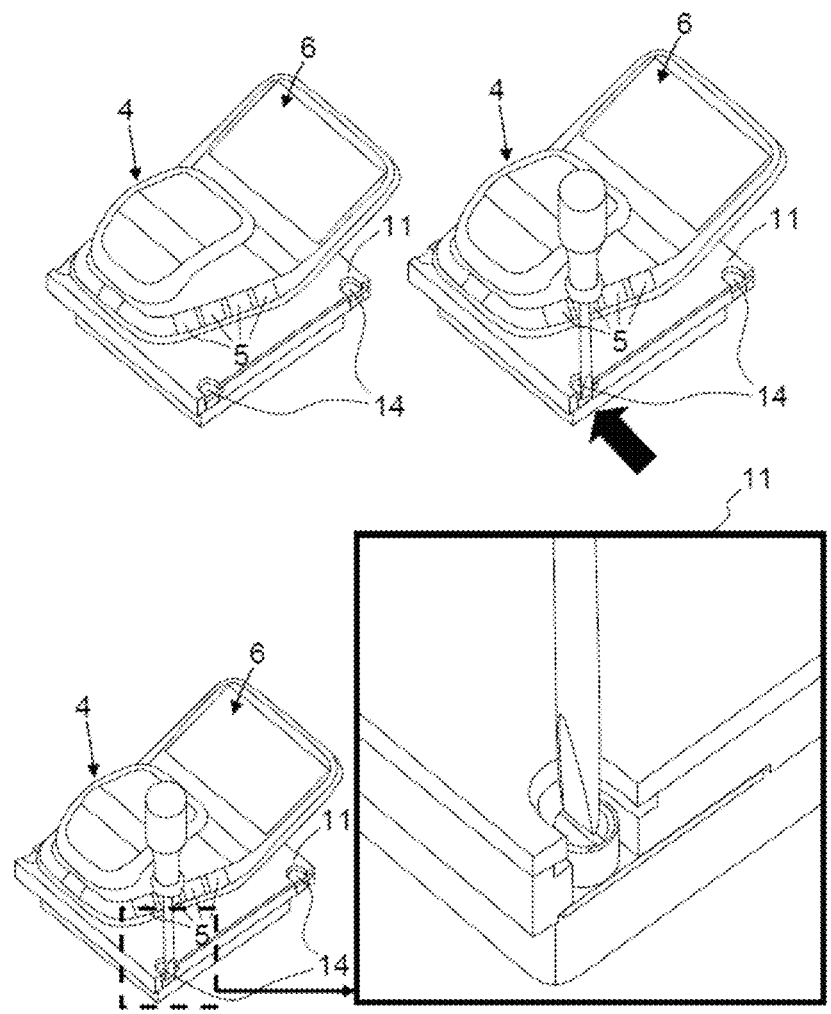
FIG. 16 schematically illustrates one embodiment in which the baseplate comprises fastening screw cover devices.

FIG. 16 schematically illustrates one embodiment in which the baseplate 11 comprises fastening screw cover devices 14. The fastening screw cover devices 14 improve the perceived quality and constitute an advantage from a sanitary standpoint. The cover, such as a plate or a valve, may be repositioned above a fastening screw using a spring or a permanent return magnet. The movement of the cover may be a translational movement and/or a rotation optionally associated with a swaying movement. This system improves the cleaning of the system without impairing availability or maintainability. Specifically, access to the fastening screws does not require any specific tool or additional tool.

The invention claimed is:

1. A system for remote interaction with a pointing means of an aircraft cockpit display system equipped with HMIs, comprising three layers:
 a lower layer configured so as to receive wired electric power supply and data exchange connections;
 an upper layer comprising a hand-rest knob, at least one physical interaction means configured so as to interact on the pointing means for pointing at the HMIs of the cockpit, and a module with a touch-sensitive flat surface configured so as to interact on the pointing device for pointing at the HMIs of the cockpit and arranged in the extension of the hand-rest knob; and
 an intermediate layer configured so as to make it possible to modify the position of the upper layer;
 wherein the upper layer has a V-shaped structure and the hand-rest knob has an inverted-V-shaped structure, and wherein the V has an angular aperture of between 65° and 250°.

2. The system according to claim 1, wherein the module with a touch-sensitive flat surface configured so as to interact on the pointing device for pointing at the HMIs of the cockpit comprises a multi-contact capacitive touch pad, or a touch screen configured so as to implement an alphanumeric keypad, or a touch surface associated with an infrared sensor.

3. The system according to claim 1, wherein the inverted V has an angular aperture of between 110° and 160°.

4. The system according to claim 3, wherein the inverted V has an angular aperture of 145°.

5. The system according to claim 1, wherein the front part of the inverted-V-shaped hand-rest knob is parallel to the rear part of the V-shaped structure.

6. The system according to claim 1, wherein the gap between the upper surface of the rear part of the V-shaped structure and the lower surface of the front part of the inverted-V-shaped hand-rest knob is greater than or equal to 20 mm.

7. The system according to claim 1, wherein the intermediate layer comprises a baseplate configured so as to be adapted to its installation position in the cockpit and to the fastening required by the aircraft.

8. The system according to claim 1, wherein the intermediate layer comprises a rotary adaptor, configured so as to rotate the upper layer about a horizontal axis, for example configured so as to tilt up to 45° with respect to the horizontal.

9. The system according to claim 1, wherein the intermediate layer comprises a translatory adaptor, configured so as to move the upper layer in translation with respect to the intermediate layer.

10. The system according to claim 7, wherein the intermediate layer comprises a rotary adaptor, configured so as to rotate the elements arranged above the baseplate jointly about a vertical axis.

11. The system according to claim 1, wherein the upper layer comprises a device configured so as to modify the angular aperture of the V-shaped structure.

12. The system according to claim 1, wherein the upper layer comprises a device configured so as to make it possible to retract the module with a touch-sensitive flat surface.

13. The system according to claim 1, wherein the upper layer comprises an ambient light device.

14. The system according to claim 7, wherein the baseplate comprises fastening screw cover devices.

* * * * *